Albert G. Thomas INVENTOR

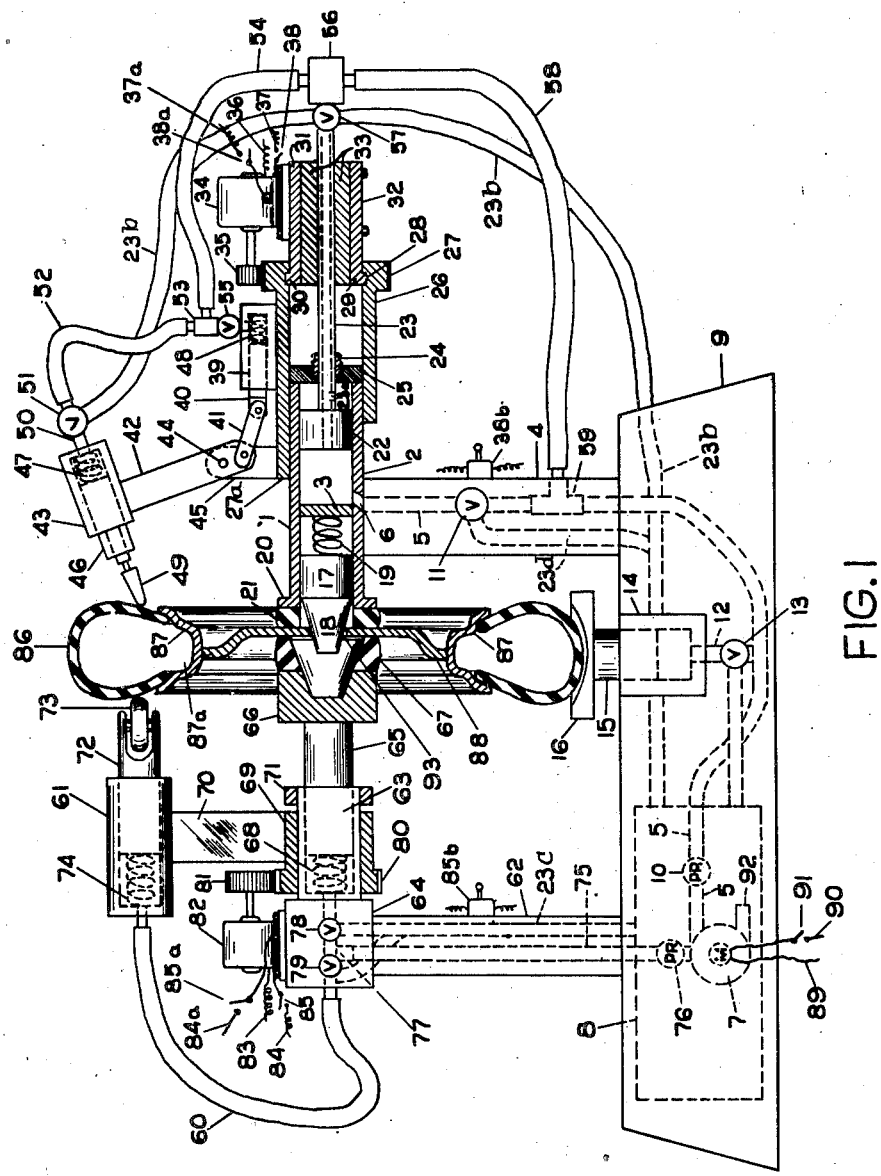

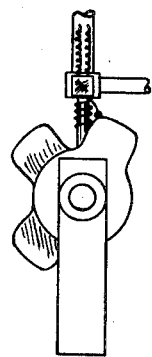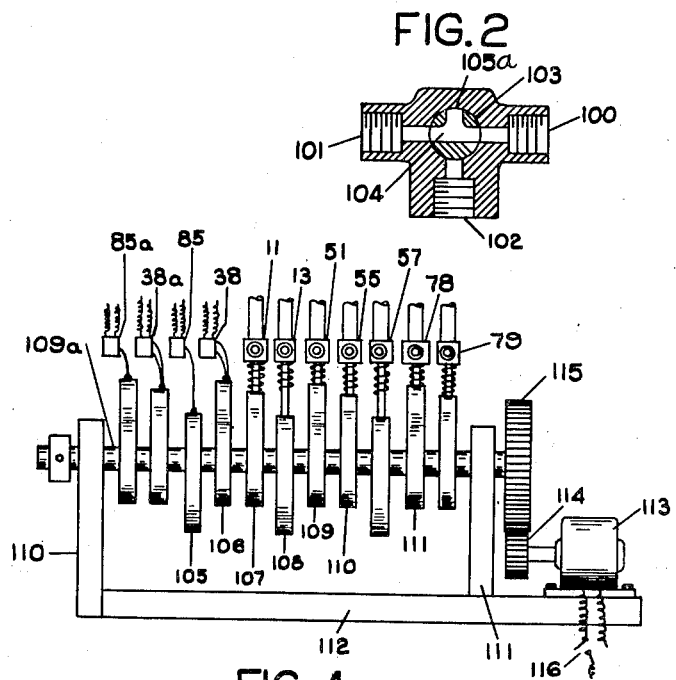

May 17, 1949.   A. G. THOMAS   2,470,534
CIRCUMFERENTIALLY TRAVELING TYPE POWER OPERATED
TIRE MOUNTING AND REMOVING DEVICE
Filed April 26, 1945   7 Sheets-Sheet 7

Albert G. Thomas INVENTOR.

Patented May 17, 1949

2,470,534

UNITED STATES PATENT OFFICE 2,470,534

CIRCUMFERENTIALLY TRAVELING TYPE POWER-OPERATED TIRE MOUNTING AND REMOVING DEVICE

Albert G. Thomas, Alexandria, Va.

Application April 26, 1945, Serial No. 590,495

7 Claims. (Cl. 157—1.24)

This invention relates to tire handling devices and has particular reference to machines for removing tires from automobile and airplane wheels or rims, or from any vehicle. The invention also provides means for replacing tires on rims or wheels.

It has long been a difficult and time-consuming chore to remove or replace tires, whether done at home, in service stations, garages, or hangars. It has been customary to beat the tires with heavy hammers to break them loose from rims and then to pry them off by means of flat bars, or other implements. Besides requiring much effort this method has often resulted in injury to tires or inner tubes or in scarring or denting rims, wheels, or other parts.

It is, therefore, a primary object of this invention to provide a tire removing and replacing device that will quickly remove or replace tires which have been punctured or which need to be handled off the wheel for any reason.

Another object is to provide a tire handling device that will be efficient in operation, requiring little effort by the operator.

A further object is to provide a tire handling device that will remove or replace tires from rims or wheels with negligible injury to tires.

An additional object is to provide a tire handling device which is largely automatic in operation.

An additional object is to provide a device that will remove tires from wheels attached to vehicles.

Other objects will be evident in the following description:

In the drawings:

Figure 1 is a part sectional side elevation of a tire handling device in which a wheel and tire or rim and tire may be rolled into the device in a vertical plane.

Figure 2 is a sectional view of a two-way valve.

Figure 3 is an end view of a plurality of cams, valves, and switches for controlling the device of Figure 1.

Figure 4 is a front view of the cam valve and switch control of Figure 3.

Figure 5:
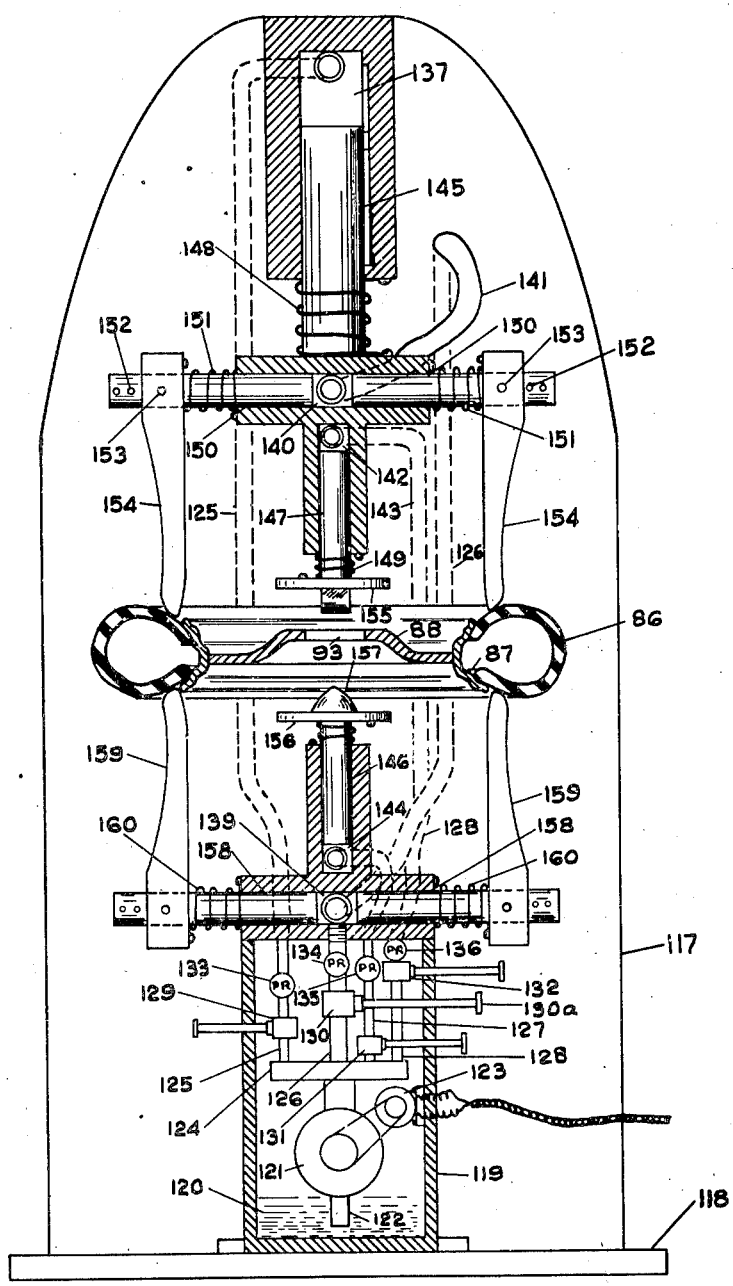
Figure 5 is a part sectional front view of a modified tire handling device.

In Figure 1, cylinder 1 is integral with cylinder 2. Partition or bulkhead 3 separates the cylinder spaces. These cylinders are welded or fastened otherwise to hollow post 4 through which pipe 5 leads to port 6 in the wall of cylinder 2. The other end of this pipe is connected with motor-driven liquid pump 7 contained in or near tank 8 which is provided in hollow base 9 of the device. Pressure relief valve 10 is connected in pipe line 5 and may be set at any desired calibration to relieve excess pressures. Valve 11 is also connected in line 5 and may be used to control flow of oil or other liquid in pipe 5 to cylinder 2.

Branch line 12 is connected with line 5 through valve 13 which controls flow of fluid to cylinder 14 fixed in base 9. Piston or plunger 15 is vertically movable in this cylinder and has attached, preferably hollowed table 16, on which a tire may be rolled. Piston 17, having frustro-conical outer extension 18, is horizontally movable in cylinder 1. Compressor spring 19, attached to partition 3 and piston 17, normally holds extension 18 in position to project to the left of flange 20 on cylinder 1. This flange has attached ring or pad 21 preferably of rubber or equivalent material.

Piston 22 is fastened to tube 23 which is slidable through packing gland 24 mounted in cylinder head 25 which may be screwed or bolted to cylinder 2. Piston 22 is suitably keyed to cylinder 2 or head 25 so that it will slide but cannot rotate. Sleeve 26 with extension 27a, is slidable and rotatable on the outside surface of cylinder 2. This sleeve has an integral end gear 27 around its periphery and has inner groove 28 into which are fitted arcuate tongues or projections 29 and 30 extending, respectively, from plates 31 and 32 which are bolted to block 33 which is welded or otherwise fastened to tube 23.

Motor 34 is fastened to plate 31 and has shaftborne pinion 35 meshed with gear 27. This motor may be energized through conductors 36, 37, and 37a, switch 38 being in circuit to control the motor in one direction and switch 38a in opposite direction.

Cylinder 39 is mounted as indicated on sleeve 26 and has slidable piston or plunger 40 which is pivoted to one end of link 41, the other end of which is pivoted to arm 42 which carries cylinder 43 attached to its upper end. This arm is pivoted at 44 to upright 45 welded or otherwise fastened to the end of extension 27a. Piston or plunger 46 is slidable in cylinder 43, being normally retracted by tension spring 47 attached to the piston and to the closed end of cylinder 43. This spring may be connected outside the cylinder if desired. A similar spring 48 normally pulls plunger 40 into cylinder 39.

Plunger 46 may be keyed to prevent rotation in the cylinder. Tapered end 49 is rotatably mounted on plunger 46 coaxially therewith and swivels with the plunger. A cylindrical portion of element 49 is rotatable in an axial bore in plunger 46.

Fluid may be supplied to cylinder 43 through pipe 50 and connected valve 51 which can be used to control the flow of fluid from connected flexible hose or pipe 52 the other end of which is connected to T 53 through valve 55, connected with cylinder 39. The remaining branch of the T is connected with flexible hose 54 the other end of which is connected with a branch of T 56 which is connected with tube 23 through valve 57 and with flexible pipe 58. The other end of this pipe is connected with T 59 in line 5.

The flexible pipes 52, 54, 58, and similar pipe 60 to be described, can be made of heavy synthetic rubber or similar material and may be reinforced with flexible metal sheathing, or otherwise. These pipes should be sufficiently long to allow free movement of the connected parts. For instance, pipes 52 and 60 should allow one or more complete revolutions of the connected cylinders 43 and 61 and pipes 54 and 58 should allow free sliding movement of the connected elements attached to member 56. Cylinder 61 can be rotated through a full revolution or more but the rotation of cylinder 43 about the axis of cylinder 1 will be limited to slightly less than one revolution on account of the obstruction of post 4. The allowable rotation is however sufficient for the purpose.

Hollow post 62 is welded or bolted to base 9, and cylinder 63 is fastened to block 64 which may be integral with post 62. Plunger 65 is horizontally slidable in cylinder 63 and carries conically hollowed disc 66 to the annular face of which is fastened rubber ring 67, or of other suitable material. Tension spring 68, connected to plunger 65 and to cylinder 63, normally holds the plunger well back in the cylinder.

Sleeve 69, carrying arm 70, is rotatable on cylinder 63 and is prevented from moving laterally by block 64 and collar 71 attached to cylinder 63. Cylinder 61 is fastened to the outer end of arm 70 and is preferably aligned parallel with the axis of cylinder 63. Plunger 72 carries roller 73 and is slidable in cylinder 61, being normally held in the cylinder by tension spring 74.

Pipe 75 leads from pump 7 through pressure relief valve 76 and passes through post 62 to T 77 the other branches of which are connected with cylinder 63 and pipe 60 respectively, through control valves 78 and 79. Ring gear 80 is integral with or fastened to sleeve 69 and is meshed with pinion 81 on the shaft of motor 82 which is attached to block 64. This motor is supplied energy through conductors 83, 84, and 84a.

Switch 85 controls rotation of the motor in one direction and switch 85a controls operation in the opposite direction.

In operation, tire 86 on the wheel comprising disc 88 and rim 87, is rolled upon table 16 which, by its own weight, normally rests against base 9. Conductors 89 and 90 are connected to a suitable source of current and switch 91 is closed to start pump 7 so that pressure will be built up in the hydraulic system. Oil or other fluid is drawn into the pump through inlet 92 and is forced out through lines 5 and 75. Pressure relief valves 10 and 76 limit the pressure or pressures in the system. Pump 7 may be of the gear type or any suitable kind.

After the pump is started and the tire is on platform or table 16 valve 13 is opened so that fluid will enter cylinder 14 and will force plunger 15 and table 16 upward. When the central opening 93 in disc 88 is in register with conically shaped element 18, valve 13 is closed and valve 78 is opened so that fluid is admitted to cylinder 63 to force plunger 65 and connected element 66 to the right, against the tension of spring 68, until rubber or other material 67 is pressed tightly against disc 88 which is supported on the opposite face by rubber ring 21. It will be observed that element 18 will be forced to the right against spring 19 until the disc 88 is pressed firmly against ring 21. Element 18 therefore serves merely to align the wheel and partially to support it but it does not take appreciable axial thrust. The tapered construction and yielding characteristic insures that wheels with central openings of various diameters will be properly aligned and supported.

Considerable pressure can be exerted by ring 67 to hold the wheel by friction but a pin or pins adapted to engage an opening or depression in disc 88 may be attached to element 66 to prevent slippage.

At starting, cylinder 61 is preferably in such position that pipe 60 will allow nearly a full revolution of sleeve 69, but of course, if a slip connection is used the cylinder can be in any angular position at the beginning.

Valve 79 is opened to admit fluid to cylinder 61 so that plunger 72 forces roller 73 against a side wall of tire 86. Switch 85 is then closed so that motor 82 will revolve roller 73 around the tire for nearly a revolution. The roller will press the tire from the rim so that it is loose on that side. While one roller is shown, a plurality can be used so that a full revolution will not be required.

Simultaneously with the opening of valve 79 and the closing of switch 85, or subsequent thereto, valve 55 is opened to cause plunger 40 to move arm 42 and cylinder 43 about pivot 44 until tapered roller 49 is in proper position to be pushed between rim 87 and the tire. The roller first breaks the tire bead away from the rim flange and later breaks its own way between the tire bead and the rim flange, when forced. Valve 55 is then closed and valves 51 and 57 are opened so that roller 49 will be pushed under the tire bead and piston 22 will be forced to the left by fluid passing into cylinder 2 through tube 23 and port 23a. This movement of piston 22 and attached tube 23 carries motor 34 and sleeve 26 to the left to force roller 49 further under the tire and valve 55 can then be opened again to cause swinging of roller 49 in clockwise direction about pivot 44. This valve may be kept open until the axis of roller 49 is inclined upward to the left. Valve 55 may then be closed or it may remain open to apply pressure, as desired. Valve 57 is then closed and valve 11 is opened so that fluid from pump 7 will enter cylinder 2 through port 6 to force piston 22 to the right. Switch 38 is then closed to cause motor 34 to rotate sleeve 26 and consequently roller 49 around the axis of cylinder 2 so that the tire is forced completely from the rim under the combined influence of the rotary movement of the roller 73 which is at the same time being urged to the right. Roller 73 may be simultaneously revolved around the tire, in angular synchronism with roller 49, or leading or lagging the latter, as desired. Roller 73, in one mode of operation, may trail behind roller 49 so that as the latter roller lifts the tire over the rim, roller 73 comes around slightly afterward and, due to pressure in cylinder 61, removes or "peels" the tire entirely from the rim.

After the tire is removed, valves 78, 79, 51, 55, and 11 are closed so that the various plungers or pistons will be restored to starting position. Flexible drain pipe 23b carries return fluid from discharge openings of valves 51 and 57 to tank 8 and, similarly, flexible drain pipe 23c carries return fluid from valves 78 and 79 to the tank. Oil is drained from valve 11 to tank 9 by means of pipe 23d connected to pipe 23b.

After roller 73 and ram or pressure disc 66 are retracted, the wheel and tire may be removed from the device, being lowered by elevator 16, if desired. After the tire is repaired or if a different tire is to be placed on the rim, then the wheel is placed back in position shown with the tire loosely placed on the rim or at least on a part of it. Then valve 78 is opened again so that ring 67 is forced against disc 88 as before, and by opening the proper valves or closing the proper switches as described, roller 73 or roller 49, or a combination of both, are moved by fluid pressure in directions to force the tire back on the rim. The rollers may be revolved at the same time or in any sequence to assist in forcing the tire onto the rim, or pressure may be exerted simultaneously at a number of points around the tire if the beads are sufficiently flexible. It is not essential to use the roller 73, particularly for replacing the tire, and the end of plunger 72 may be rounded and used as a pressure element which can also be rotated. The tire may be placed on the rim so that pressure only at one point or over a short arc is necessary in order to force the tire back on the rim. The inner tube stem can be manipulated by hand.

Motors 34 and 82 are preferably of the geared down type so that sleeves 26 and 69 will be rotated rather slowly. The speeds of these motors can be variable. It is obvious that fluid operated motors could be used.

A very wide variety of combinations, sub-combinations, and varied arrangement of parts and altered mode and sequences of operation can be readily achieved without varying the fundamental principles of the device.

The valves 11, 13, 51, 55, 57, 78, and 79 may be of the type shown in Figure 2 in which pipes are screwed into threaded inlet 100, outlet 101, and drain 102. Rotary element 103 has channel 104 which will pass fluid through the valve when this channel is in alignment with the inlet and exit ports as shown. When the valve is turned ninety degrees counter-clockwise the flow from inlet 100 to exit 101 is stopped but channel 105a at right angles to, and connecting with channel 104, is brought into register with outlet 101, and channel 104 connects with drain 102 which leads back to the tank.

As shown in Figures 3 and 4, the valves, of whatever design, may be operated automatically by means of a plurality of cams as indicated or they can be operated electrically by means of suitable solenoids and commutators. The cams 105, 106, 107, 108, 109, 110 and 111 are mounted on shaft 109a which has rotary bearing in posts 110 and 111 fixed to base 112. Geared-down motor 113 is fastened to base 112 and has pinion 114 on its shaft to drive gear 15 which is fixed to an end of shaft 109a.

Valves 11, 13, 51, 55, 57, 78, 79 may be supported by connected pipes or by any suitable part of the machine or device. These valves are indicated diagrammatically and are shown aligned with shaft 109a, their operating arms being biased by springs, as indicated, to press against the cams. These operating arms may be linearly movable or rotary as desired. Switches 85 and 38, and also switches 85a and 38a if desired, are mounted in the machine so that their operating arms are spring-pressed against cams 105 and 106. The remaining cams are aligned with the respective valves or switches. These cams may each have one or a plurality of elevations or depressions, suitably spaced, so that a switch or a valve may be opened or closed a number of times during one revolution of shaft 109a. The positions of the cams may be adjustable, angularly, so that the relative phasing of the various valve or valve and switch operations may be adjusted. Base 112 is fastened to the device in any desired manner.

Automatic operation of the valves and switches may then be accomplished in proper timing and sequence by closing switch 116 controlling the circuit leading to motor 113. The switches and valves, after being calibrated, will then be opened and closed, in the proper order to control the desired operations. Switch 116 may be automatically cut off by a moving part of the device, if desired.

Figure 6:
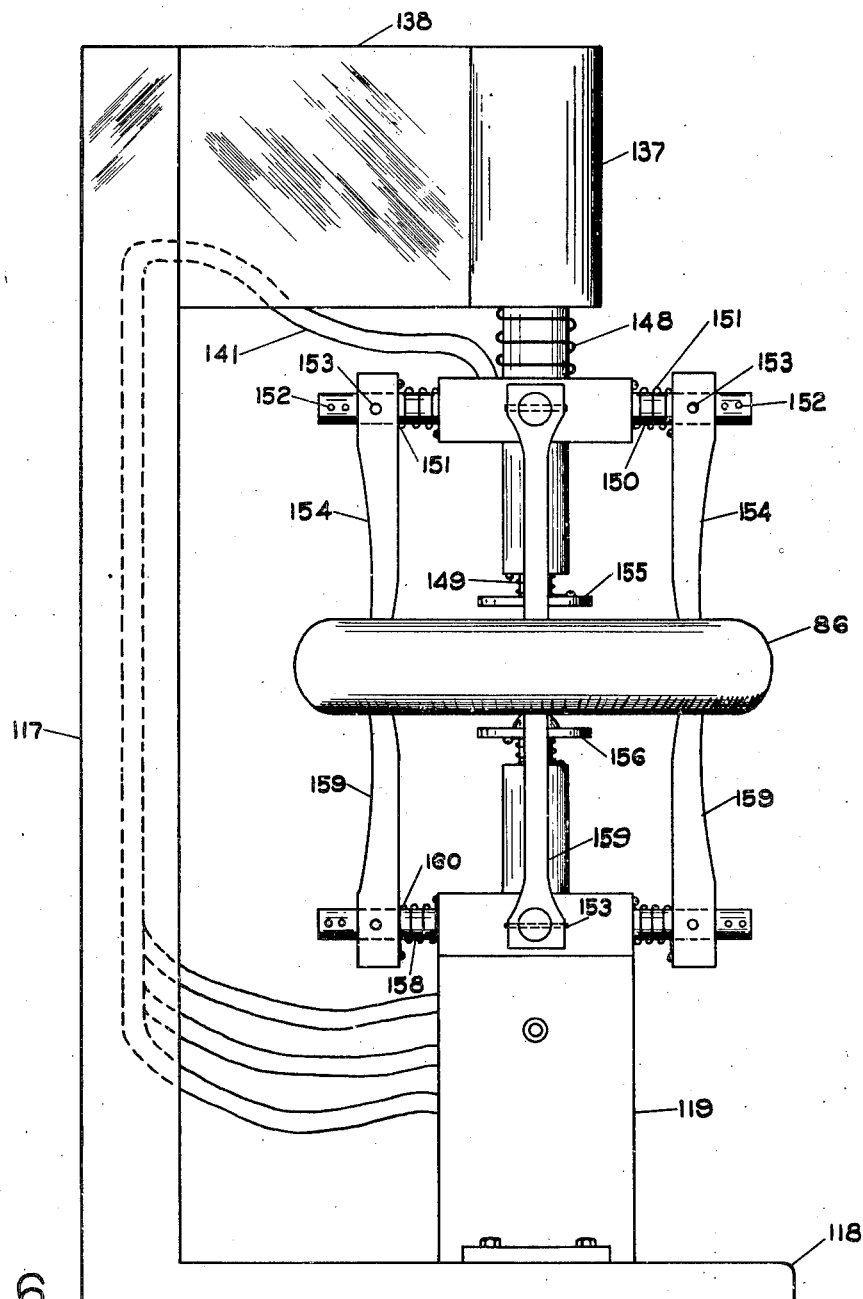
Figure 6 is a side view of the device shown in Figure 5.

In Figures 5 and 6, wide, hollow upright or back 117 is fastened to base 118 and tank 119 is bolted to the base. This tank holds oil or other fluid 120 and contains pump 121 with inlet 122, suitably fastened. This pump is driven by motor 123 which may be suitably energized. Manifold 124 is connected with the outlet of pump 121 and has connected fluid discharge pipe lines 125, 126, 127, and 128 having respective control valves 129, 130, 131, 132 and pressure relief valves 133, 134, 135, and 136.

Pipe line 125 leads to cylinder 137 fastened to hollow arm 138 extending from back 117, and pipe line 126 leads to cylinder 139 and to cylinder 140 through flexible hose connection 141. Flexible pipe line 143 similarly connects pipe line 128 with cylinder 142 which is integrally formed with cylinder 140 but is separated therefrom. Cylinder 144 is similarly formed integrally with cylinder 139 but is separate with respect to the chambers. Pipe line 127 is connected with cylinder 144. The various pipes are placed in back 117 and arm 138 which are hollow.

Pistons or plungers 145, 146, and 147 are slidable in cylinders 137, 142, and 144 respectively. Plunger 146 is normally held in the cylinder by gravity and plungers 145 and 147 are normally pulled into their respective cylinders by attached tension springs 148 and 149. Plungers 150 are opposed in cylinder 140 and are normally retracted by springs 151. These plungers have cross holes 152, and arms 154 are bored to slide on the plungers, being locked to the plungers at desired positions by pins 153 passing through holes in the arms and plungers. These arms could be adjusted by other means than pins as by threaded rods or the like.

Pressure plate 155, which may be rubber covered, is fastened to the lower end of plunger 147 and plate 156 with central, integral cone 157 is attached to the upper end of plunger 146.

Opposed plungers 158 are slidable in cylinder 139 and carry adjustable arms 159 similar to arms 154. Springs 160 normally pull the plungers into cylinder 139 to their limiting positions.

In operation, tire 86 and wheel and rim 88—87 are placed as shown, with the tire 86 resting on arms 159 which have been adjusted on plungers 158 to the proper radii so that rim 87 will not be struck. Then arms 154 are similarly adjusted and valve 129 is opened, after motor 123 is energized to operate pump 121, so that fluid 120 will be pumped through line 125 to force plunger 145 and arms 154 downward. These arms are preferably arranged in alignment with arms 159 and so the tire walls will be pressed together, or almost so, at points between the arms. Now if valve 130 is opened by means of extended knob 130a, then fluid will be pumped into cylinders 139 and 140, through pipe line 126, and plungers 150 and 158 will be forced outward to stretch the tire. Any suitable number of pairs of plungers and tire stretching arms can be used and these can be operated simultaneously or in sequence. If desired the tire could be stretched only at one point so that it will start off the rim easily.

After the tire is compressed and stretched at one or more points, valve 131 is opened so that fluid is admitted to cylinder 144. Plunger 146 is then forced up so that plate 156, aligned with respect to the wheel by cone 157 passing into central opening 93, forces wheel disc 88 upward to push the rim 87 through the tire. The valves are then closed, or some of them previously as desired, and the plungers are returned to normal positions by the springs. The tire can then be removed.

If it is desired to place the tire on the rim, plungers 150 and 158 can then be locked, hydraulically or otherwise, in their positions and tire 86 is placed on arms 159. Rim 87 is then placed above the tire in aligned position. The valve 129 is then opened to cause piston 145 to be forced downward, thereby squeezing the tire between arms 154 and 159. Then valve 130a is opened to cause pistons 150 and 158 to move arms 154 and 159 outward to expand the tire. Next, valve 132 is opened to cause piston 147 and disc 155 to force the rim into the tire. The valves are then closed and the tire is lifted off the arms 159 after arms 154 are raised. The valve stem of the inner tube is of course properly placed in the rim before forcing the rim into the tire. There can be a sufficient number of arms 159 to support the tire adequately and these arms may be wide, flanged or narrow as desired. Plate 156 could be extended sufficiently to serve as a tire support or an additional ring or other element for this purpose can be used.

Figure 11:
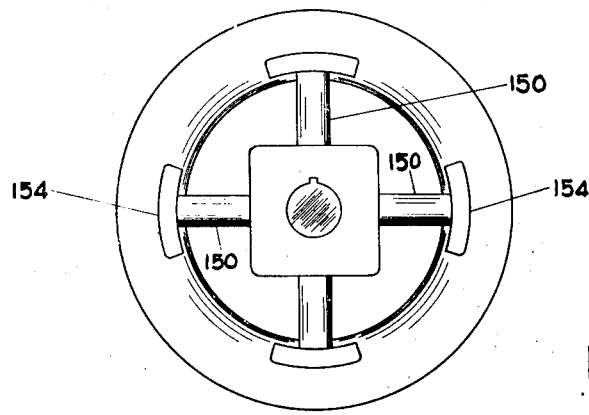
Figure 11 is a plan view of a tire and a plurality of tire pressing elements.

Figure 11 shows a form of the device in which four arcuate arms 154 are attached to four plungers 150. Arms 159 and plungers 158 can be similarly constructed.

Figure 7:
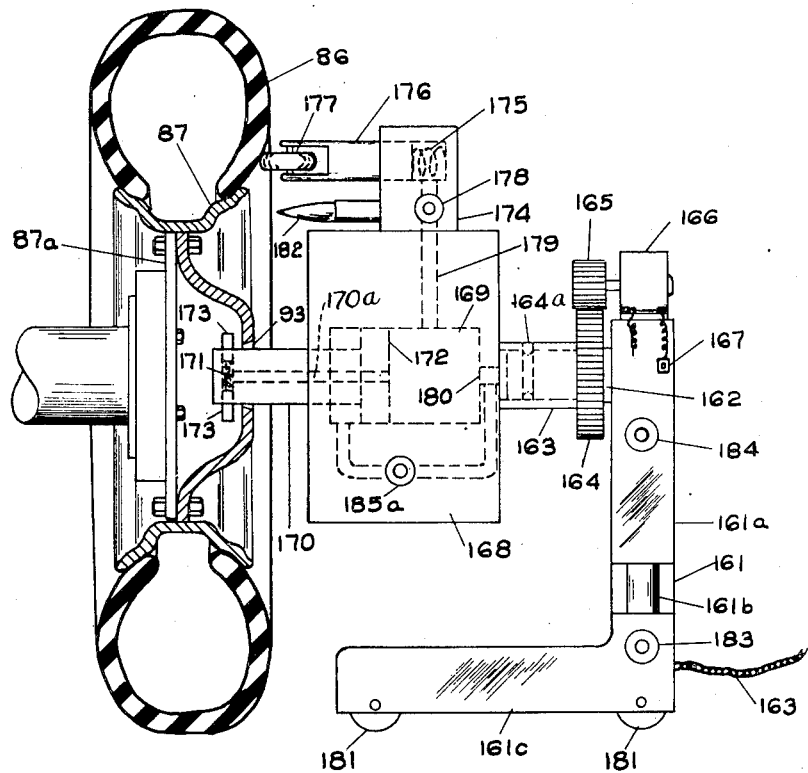
Figure 7 is a side view of another modified tire handling device, with a wheel and tire shown in part section.

In Figure 7, tire 86 is on rim 87 which is fastened to the vehicle. Portable pumping unit 161 with wheels 181 and connected cable 163 supplying energy to the pump motor in the unit, is provided with horizontal hollow shaft 162 on which sleeve 163 is rotatable, being held in axial alignment by pin 164a in sleeve 163 cooperating with a suitable groove in shaft 162. Ring gear 164 is fixed to sleeve 163 and meshes with pinion 165 on the shaft of motor 166 which is fastened to unit 161. Switch 167 may be used to control the motor circuit.

Drum 168 with inner cylinder 169 is attached to sleeve 163. Shaft 170, with cross bore 171 and axial bore 170a leading to cylinder 169, is attached to piston 172 which is slidable in cylinder 169. Shaft 170 passes through a suitable packed bearing in drum 168. Small plungers 173 are slidable in bore 171 against spring tension.

Arm 174, which may be adjustable radially, is carried by drum 168 and has bore 175 in which plunger 176 is movable. This plunger is shown with attached roller 177 but any suitable tire pressing or lifting device can be used. Valve 178 controls flow of fluid from unit 161 to cylinder or bore 175 through pipe 179 which connects with cylinder 169. This cylinder admits fluid through axial opening 180 connected with pump system through shaft 162.

One or more tapered or curved plungers 182 may be slidable in arm 174 and can be connected with control valve 178. The upper part 161a may be vertically adjustable with respect to the base 161c housing the fluid pressure equipment, and the elevation can be controlled by valve 183 so that the height of lift of plunger 161b, carrying housing 161a, can be regulated. Valve 184 may be used to control the flow of fluid to cylinder 169 on the right side of piston 172 and valve 185a controls the flow of fluid to the left side of the piston.

In operation, the device is rolled adjacent tire 86, which is on the wheel 87a, and is adjusted until shaft 170 is aligned with opening 93 in the wheel, the cap having been removed. Shaft 170 is pushed into opening 93 and valve 184 is opened to admit fluid under pressure to bore 171 so that plungers 173 will be forced outward to lock the shaft to the wheel. Valve 178 is then opened so that plunger 176 is pushed to the left to force the tire away from the edge of the rim. Motor 166 can then be started by closing switch 167 so that the roller 177 will be moved around the side wall of the tire to loosen it from the rim. The tire can then be manually removed since the pressure and flexing of the tire will also loosen the left bead; or curved hook 182 can be rotated under the tire and the whole tire pulled off as described in connection with Figure 8.

Figure 8:
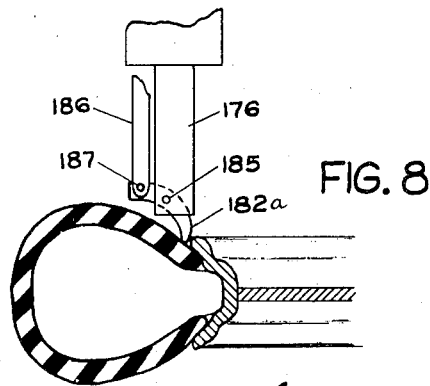
Figure 8 is a fragmentary part sectional elevation of a tire and wheel and a pivoted tire lifting finger.

The tool 182 may be of the form shown in Figure 8 in which curved claw or element 182a is pivoted at 185 to plunger 176 and rod 186 is pivoted at 187 to an arm of the claw which can then be forced under the tire by pulling rod 186. If tool or claw 182 is sufficiently curved it can be hooked under the tire so that the whole tire will be pulled off the rim when plunger 176 is retracted in axial direction from the rim.

Figure 9:
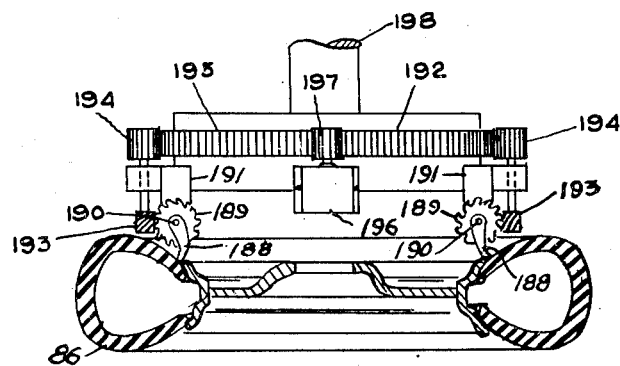
Figure 9 is a view of details of worm driven tire lifting fingers which may also be rotated about the axis of the tire.

Other means for operating the claw are shown in Figure 9 in which curved claws 188 are fastened to gears 189 which are rotatable about pivots 190 fastened to supports 191 integral with ring 192. Worms 193 are meshed with gears 189 and are driven by gears 194 on attached shafts having bearing in supports 191. Ring gear 195 is rotatable around ring 192, in a groove, and is driven by motor 196 and connected pinion 197.

Therefore motor 196 may be energized to rotate ring gear 195 in one direction or the other, to move claws 188 toward or away from tire 86. Any suitable number of claws may be used and they may be rotated relative to the tire by means of shaft 198 fastened to ring 192.

Figure 10:
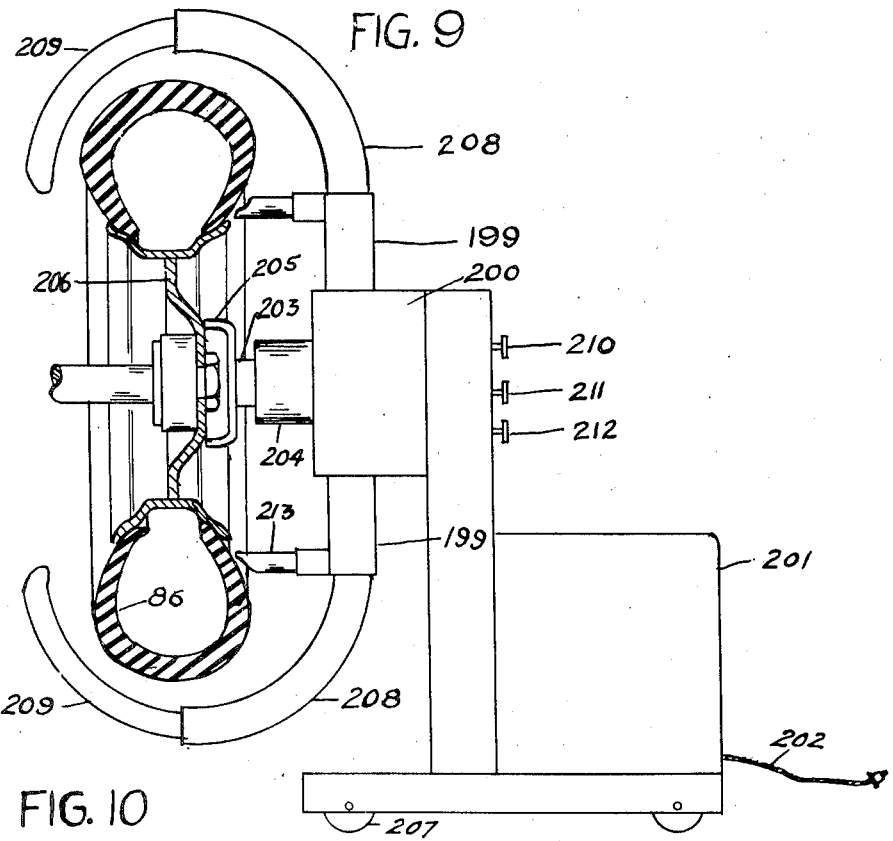
Figure 10 is a side elevation of a tire handling device, with tire and wheel in part section, for removing tires from wheels of vehicles, and for replacing them.

A modified form of device for removing tires from wheels attached to vehicles is shown in Figure 10. Plungers 199 are movable in either end of cylinder 200 by fluid pressure from tank 201 which includes a built-in electric pump supplied with current by cable 202. Plunger 203 is horizontally slidable in cylinder 204 attached to cylinder 200. This plunger carries yoke or cup 205 which is adapted to straddle a central opening or nut in wheel 206 carrying tire 86. Suitable springs may retract the plungers.

Tank 201 is mounted on wheels 207. Plungers 199 have arcuate extensions 208 in which similarly curved hooks 209 are retractible, by springs or otherwise. These hooks may be forced out by fluid pressure to the positions shown, suitable stop lugs or other means being provided to limit outward movement. Valve 210 controls fluid flow to cylinder 200 and valve 211 controls the flow of fluid to cylinder 204. Likewise, valve 212 controls flow of fluid to curved extensions 208 which serve as cylinders for hooks 209 acting as plungers or pistons. Suitable flexible connections can be used.

In operation, the device is rolled near a tire on a wheel attached to a vehicle and valve 210 is opened, after the pump is started, to allow fluid from tank 201 to be pumped into cylinder 200 until plungers 199 are forced out for a sufficient distance as determined by the diameter of the tire. Then valve 210 is closed and valve 212 is opened so that hooks 209 are forced around the tire to the approximate positions shown. Next, valve 211 is opened to admit fluid under pressure to cylinder 204 so that element 205 is forced against the wheel. This results in the tank and arms or hooks 209 being forced to the right to pry the tire from the rim. The pressure of the hooks forces the tire off the rim. The axle is of course suitably supported. If desired, additional valves or a valve timing arrangement can be included so that only one hook is at first put under pressure, in order to start the tire at one location. The other hook or hooks can be energized then simultaneously or in rotation. Other tire removing devices shown, such as tapered pressure-operated rollers or the like can be combined with the hooks or other means indicated in Figure 10.

Pressure-operated plungers 213 can be provided for forcing the tire back on the rim. The tank 201 can be fixed to prevent sliding or the device can be hooked to the wheel, in any desired way, when the tire is replaced. The plungers 213 also assist in breaking the right tire bead away from the rim so that pressure of hooks 209, as a reaction resulting from movement of plunger 203 out of cylinder 204, forces the tire completely from the rim. The tire is first squeezed between elements 209 and 213 and then is pulled off the rim by hooks 209 as plunger 203 is forced out of cylinder 204 and consequently causes the cylinder block 200 and supporting wheels 207 to be moved to the right. The assistance of elements 213 is not essential in removing the tire as the pressure from hooks 209, alone, will force the tire off. It is obvious that the stroke of plungers 213, if used in removing tires, should be less than the stroke of plunger 203.

Figure 12:
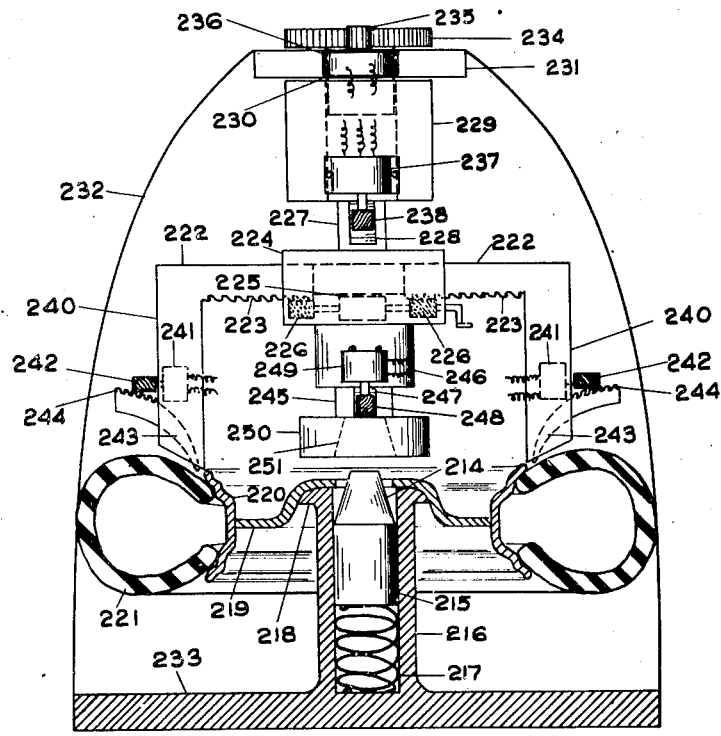
Figure 12 is a front elevation, in part section, of a rotatable tire handling device having an automatic aligning table to hold the tire in horizontal position.

In Figure 12 is shown a gear-driven tire removing and replacing machine. Cone shaped element 214 is integral with piston 215 which is vertically slidable in cylinder 216, being urged upward by spring 217. Cylinder 216 has flange 218 which serves as a support for wheel disc 219 carrying rim 220 on which tire 221 is placed. Arms 222, with bottom racks 223, are horizontally movable in suitable openings in block 224, being driven by motor 225 having worms 226 attached to the ends of its double shaft. These worms are meshed with racks 223 as indicated, and are so disposed that the arms 222 will be simultaneously moved inward or outward.

Shaft 227, with rack or gear teeth 228 extending along its length, is vertically movable in cylindrical block 229 which has integral stub shaft 230 which is rotatable in a suitable bearing in shelf 231 extending from back or upright 232 which is attached to base 233. Gear 234 is fixed to the upper end of the stub shaft 230 and has a suitable hub or bearing surface which rests upon shelf 231 so that when meshed pinion 235 on the shaft of motor 236 is revolved, gear 234 and block 229 are revolved. Shaft 227 is suitably keyed to block 229 so that it can slide into and out of the block but will be rotated with it.

Motor 237 is fastened to block 229 and has worm 238 on its shaft. This worm is meshed with rack or teeth 228 extending lengthwise of shaft 227 so that this shaft may be extended from or withdrawn into block 229 by energizing motor 237 to revolve in one direction or the other.

Depending arms 240 are integral with arms 222 and have attached motors 241 driving worms 242 which are meshed with curved racks or teeth 244 on the top edges of curved claws 243. These claws 243 are movable through suitably shaped channels in arms 240 and are positioned to reach under a bead of tire 221 when they are extended.

Shaft 245 is vertically movable in block 246 attached to block 224. This shaft has teeth 247 similar to those on shaft 227. These teeth are meshed with worm 248 driven by motor 249 attached to block 246. Pressure flange or plate 250, with central cavity 251, is fastened to shaft 245. This element may be covered with rubber or similar material, as may table 218. The cavity allows element 214 to enter so that ram 250 may strike disc 219.

The motors indicated may be energized for forward or reversed rotation by means of suitable flexible conductors, slip rings, and switches, or the like. Block 224 is attached to piston 227.

In operation, wheel disc 219 is placed on flange or table 218 with its central opening over conically shaped element 214 which will align the wheel and will be forced down by the weight until disc 219 rests on the table. Motor 249 is then connected in circuit by closing a suitable switch so that plate or ram 250 will be forced down against disc 219 which will be pressed tightly against table 218. A friction clutch or current cut-out may be used to protect the motor. The motor 225 is energized to move arms 240 inward or outward until they are suitably positioned. Motor 225 is then stopped and motor 237 is energized to force arms 240 down against the tire to break it loose from the rim. Then motors 241 are energized to force claws 243 under the tire bead and motor 236 is energized to cause rotation of the claws around the tire. Simultaneously, previously, or subsequently thereto, motor 237 can be energized in a direction to pull arms 240 upward so that the tire will be lifted from the rim as the claws are rotated around the tire. Motor 237 can, if desired, be stopped when arms 240 have been lifted sufficiently.

When the tire is removed and the motors are stopped, after the various elements have been moved to proper positions, it can be replaced by setting it on the rim and energizing motor 237 to move arms 240 downward to force the tire back on the rim. This may be done with or without rotation of the arms by motor 236, as desired.

When it is desired to remove the tire or the wheel or both, motor 249 can be energized to lift element 250 to release them.

It is apparent that a large number of combinations of various parts and devices shown could be made. Many fluid operated parts shown could be operated mechanically or vice versa and many of the mechanically, or motor driven parts could be operated by fluid pressure. Compressed air could, of course, be employed instead of liquid, and a compressed air outlet could be combined with the machine, for inflating tires. Furthermore, a sunction device can also be combined with the machine, for quickly removing air in a large tire for instance.

The drain pipes 23b, leading from the control valves, are carried back to the liquid storage tank. These pipes insure that the cylinders will be provided with outlets on reverse strokes of the pistons.

Many other changes of detail, rearrangement of parts, or varied combinations, can be employed without departing from the broad principles of my invention.

What I claim is:

1. In a tire handling device, means for holding a wheel carrying said tire, a first cylinder coaxial with said wheel, a first piston movable in said cylinder, a sleeve rotatable and slidable on said cylinder, means connecting said piston and sleeve, a second cylinder carried by said sleeve, a second piston movable in said second cylinder, a tire-removing element attached to said second piston, means for rotating said sleeve around said first cylinder, and means for producing fluid pressure in said cylinders to actuate said pistons.

2. In a tire handling device, means for holding a wheel carrying said tire, a first cylinder coaxial with said wheel, a first piston movable in said first cylinder, a sleeve rotatable and slidable on said first cylinder, means connecting said piston and sleeve, a second cylinder pivotally mounted on said sleeve, a second piston movable in said second cylinder, a tire-removing element attached to said second piston, means for rotating said sleeve around said first cylinder, and means for producing fluid pressure in said cylinders to actuate said pistons.

3. In a tire handling device, means for holding a wheel carrying said tire, a first cylinder coaxial with said wheel, a first piston movable in said first cylinder, a member rotatable coaxially with respect to said first cylinder and axially slidable relative thereto, means connecting said first piston and said member, means for rotating said member, a second cylinder carried by said member, a second piston movable in said second cylinder, a tire-removing element connected with said second piston and means for producing fluid pressure in said cylinders to actuate said pistons.

4. In a tire handling device, means for holding a wheel carrying said tire, a first cylinder coaxial with said wheel, a first piston movable in said first cylinder, a member rotatable coaxially with respect to said cylinder and axially slidable relative thereto, means connecting said first piston and said member, means for rotating said member, a second cylinder carried by said member, a second piston movable in said second cylinder, a tire-removing element connected with said second piston, a shaft supported by said device on the opposite side of said wheel from said first cylinder, a second member rotatable on said shaft, means for rotating said second member, a third cylinder carried by said second member coaxially with said shaft, a third piston movable in said third cylinder, a tire-pressing element attached to said third piston, and means for producing fluid pressure in said cylinders to actuate said pistons.

5. The structure recited in claim 4 wherein, said fluid pressure means include flexible conduits, a pump, a motor to drive said pump, and valves to control flow of said fluid.

6. In a tire handling device, means for holding a wheel carrying said tire, a tire-removing element, means for rotating said element coaxially with said wheel, means for moving said element toward or away from said tire, a tire-pressing element on the opposite side of said tire from said tire-removing element, means for rotating said tire-pressing element coaxially with said wheel, means for moving said tire pressing element toward said tire, fluid pressure means for operating said moving means, motor means for operating said rotating means, switch means for controlling said motor means, valve means for controlling said fluid pressure means, and means for causing operation of said switch means and valve means in predetermined order.

7. The structure recited in claim 6 wherein, said means for causing operation of said switch means and valve means include a plurality of cams.

ALBERT G. THOMAS.

REFERENCES CITED

The following references are of record in the file of this patent:

UNITED STATES PATENTS

| Number | Name | Date |
|---|---|---|
| 1,208,184 | Mayer | Dec. 11, 1916 |
| 1,341,727 | Weaver | June 1, 1920 |
| 1,416,094 | Krauska | May 16, 1922 |
| 1,742,590 | Freivogel | Jan. 7, 1930 |
| 1,758,264 | Senger | May 13, 1930 |
| 1,824,246 | Van Daam | Sept. 22, 1931 |
| 1,964,119 | Hendry | June 26, 1934 |
| 1,966,766 | Raby et al. | July 17, 1934 |
| 2,034,819 | Maulis | Mar. 24, 1936 |
| 2,043,169 | Hawkinson | June 2, 1936 |
| 2,228,086 | Rodgers | Jan. 7, 1941 |
| 2,281,476 | Casey | Apr. 28, 1942 |
| 2,413,010 | Teegarden | Dec. 24, 1946 |
| 2,418,849 | Polt | Apr. 15, 1947 |
| 2,423,652 | Kelley | July 8, 1947 |
| 2,437,512 | Ekse | Mar. 9, 1948 |
| 2,439,135 | Johnson et al. | Apr. 6, 1948 |